Nov. 23, 1965 D. E. THOMAS 3,219,924
AUTOMATIC LOCATION OF MAXIMA OR MINIMA IN RESPONSE
CURVES OF WAVE-RESPONSIVE MEDIA
Filed Sept. 1, 1961 2 Sheets-Sheet 1

INVENTOR
D. E. THOMAS
BY R. B. Ardis
ATTORNEY

INVENTOR
D. E. THOMAS
BY
ATTORNEY

United States Patent Office 3,219,924
Patented Nov. 23, 1965

3,219,924
AUTOMATIC LOCATION OF MAXIMA OR MINI-
MA IN RESPONSE CURVES OF WAVE-RESPON-
SIVE MEDIA
Donald E. Thomas, Madison, N.J., assignor to Bell Telephone Laboratories, Incorporated, New York, N.Y.,
a corporation of New York
Filed Sept. 1, 1961, Ser. No. 135,656
6 Claims. (Cl. 324—57)

This invention relates generally to curve tracing methods and apparatus and more particularly to curve tracing methods and apparatus for determining maxima and minima in the response characteristics of wave responsive materials.

One object of the invention is to determine automatically either maxima or minima in the response characteristics of wave responsive materials.

A related object is to increase the accuracy with which maxima or minima in the response characteristics of wave responsive materials can be determined.

There are important occasions in the electrical measurement field when it is desirable to ascertain the precise locations of maxima or minima in the response characteristics of wave responsive materials. One such occasion is illustrated by the disclosure of U.S. Patent 3,109,932, which issued November 5, 1963, to W. G. Spitzer. Spitzer teaches that the resistivity of a semiconductive material may be determined non-destructively by measuring the infrared reflectivity of the material as a function of wavelength and determining the wavelength at which minimum reflectivity occurs. The same result is obtained, of course, by measuring infrared transmission and determining the wavelength at which maximum transmission occurs.

In the past, maxima and minima in such response curves or characteristics have generally been determined visually, either from direct plots of the curves themselves or from plots of derivatives of the curves following a differentiation process. While such techniques yield results which are often quite acceptable, they are subject to human error since they require the exercise of judgment in interpreting a plotted curve and are somewhat variable in their accuracy.

The present invention overcomes these disadvantages of the prior art and determnies maxima or minima automatically and with a higher degree of precision. In accordance with the invention, maxima or minima in the curve of the response of a material to a wave plotted against a parameter of that wave are determined by applying the wave to the material, superimposing a periodic variation of substantially constant magnitude on the wave parameter, detecting the change in response caused by the superimposed variation, and shifting the parameter in a direction determined by the phase of the detected response change until the response change becomes substantially zero in magnitude and reverses in phase. The parameter value at which response is maximum or minimum can then be read directly from a calibrated dial, eliminating any need for attempting to determine the precise value by visual inspection of a plotted curve. Maxima and minima are obtained from respectively opposite phasings of the detected response changes used to shift the wave parameter.

Application of the invention to automatic measurement of semiconductor resistivity involves applying an infrared wave to the material being tested, superimposing a periodic variation of substantially constant magnitude on the wavelength of the infrared wave, detecting the response change caused by the superimposed variation, and shifting the wavelength of the infrared wave in the direction indicated by the phase of the detected response change until the magnitude of the detected response reaches the vanishing point and its phase reverses. The wavelength at which the magnitude of the response change vanishes and the phase reverses is an accurate measurement of the resistivity of the semiconductive material being tested.

A more complete understanding of the invention may be obtained from the following detailed description of several specific embodiments. In the drawings.

Figure 1:
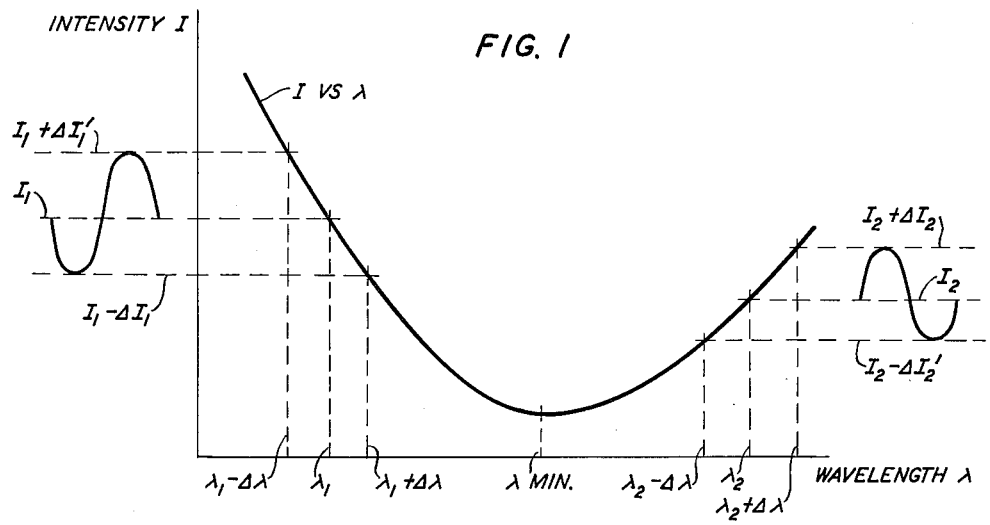
FIG. 1 is an example of a response intensity versus wavelength curve used to illustrate the underlying principles of the invention.

The intensity versus wavelength curve shown in FIG. 1 has a pronounced minimum which can be readily determined with a high degree of precision with the aid of the present invention. The curve itself is a typical illustration of the manner in which the amount of infrared light reflected from a semiconductive material varies with the wavelength of that light. As taught by Spitzer, the wavelength at which the reflected light, and hence the infrared reflectivity of the material, is minimum is a direct measure of the resistivity of the material. Precise measurement of the wavelength at which the reflection is minimum is, therefore, necessary to a reliable determination of resistivity by Spitzer's teaching.

For an automatic determination of the wavelength at which the reflection is minimum, a periodic variation of substantially constant magnitude is, in accordance with the invention, superimposed upon the wavelength of the infrared light employed. This variation may, as illustrated in FIG. 1, be sinusoidal in character and have a maximum extent of $\Delta\lambda$. As shown, such a variation in wavelength $\lambda$ results in a corresponding change in the intensity I of the reflected light. This intensity change has a magnitude and a phase which depend upon the slope of the intensity versus wavelength curve at the center wavelength being used. Its magnitude decreases as the wavelength of minimum intensity is closely approached and, even more importantly, its phase is dependent upon the side of the minimum upon which the wavelength of the infrared radiation being used falls. Magnitude becomes substantially zero at the wavelength of the minimum, while phase reverses.

Figure 2:
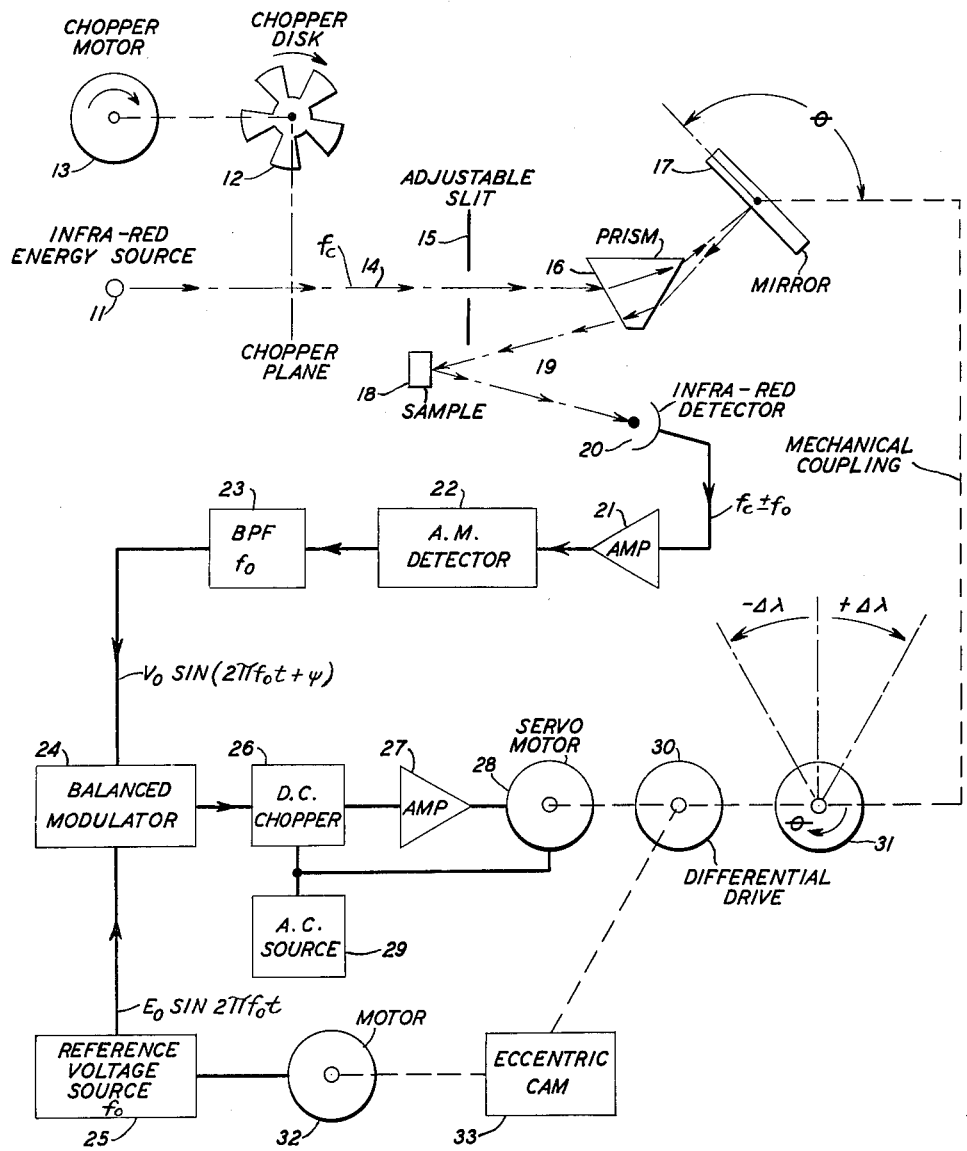
FIG. 2 illustrates the application of the invention to a spectrometer for automatic measurement of the resistivity of a semiconductor material.

The embodiment of the invention illustrated in FIG. 2 takes the form of a spectrometer and the control mechanism employed for insuring a precise automatic determination of the wavelength of minimum infrared reflection. As shown in FIG. 2, infrared energy from a source 11 is projected through the plane of a rotating apertured chopper disk 12. Disk 12 is driven at constant speed by a motor 13, resulting in bursts of infrared energy 14 occurring at a predetermined rate or frequency $f_c$. These bursts are passed through an adjustable slit 15 to provide focusing and through a prism 16 to impinge upon an adjustable mirror 17. Mirror 17 reflects the infrared light back through prism 16 to impinge upon the sample 18 of semiconductive material being tested. The angle at which the infrared energy strikes mirror 17 is varied by mechanical rotation of the mirror. As a result of different velocities of infrared energy transmission through prism 16 for different wavelengths, the wavelength $\lambda$ of the infrared energy 19 impinging upon sample 18 is dependent upon the angular position $\theta$ of mirror 17. The wavelength of the infrared energy 19 can thus be swept between predetermined limits simply by revolving mirror 17 through a corresponding arc.

In the embodiment of the invention illustrated in FIG. 2, the infrared energy reflected from sample 18 is collected by a suitable infrared detector 20, which converts the bursts of infrared energy into electrical impulses of the same repetition rate or frequency. The amplitude of the train of electrical impulses produced by detector 20 is a direct measure of the intensity I of the train of infrared energy bursts reflected from sample 18. As has already been explained, it is this intensity I which is plotted against the wavelength λ of infrared energy in FIG. 1.

In accordance with an important feature of the invention, mirror 17 is made to oscillate back and forth over a predetermined arc of substantially constant magnitude within its rotational range at a frequency $f_o$, causing the wavelength λ of the infrared energy 19 reaching sample 18 to vary in a similar manner. The electrical signal obtained from infrared detector 20 is thus in the form of an amplitude-modulated wave with the sidebands $(f_c+f_o)$ and $(f_c-f_o)$. The extent of the oscillation imposed upon mirror 17 is kept small in comparison with the total rotational range of the mirror.

After infrared detector 20, the electrical signal obtained from the infrared light reflected from sample 18 encounters an amplifier 21, an amplitude-modulation signal detector 22, and a band-pass filter 23. Amplifier 21 is tuned to the center frequency $f_c$ of its received signals and has a bandwidth of at least $2f_o$ to accommodate both sidebands in full. The amplified carrier and sidebands are demodulated by detector circuit 22, which converts them to a direct-current signal with a superimposed alternating-current component of frequency $f_o$. Filter 23 is tuned to the frequency $f_o$ and eliminates the direct current. As a result, an alternating-current signal $$V_o \sin (2\pi f_o t+\psi)$$

is supplied from band-pass filter 23 to a balanced modulator 24. At the same time, a reference voltage $$E_o \sin 2\pi f_o t$$

is applied to modulator 24 from a source 25. Balanced modulator 24 provides a single direct output voltage which is dependent in amplitude upon the magnitude of $V_o$ relative to $E_o$ and dependent in polarity upon whether $\psi$ is 0 or $\pi$. As can be seen readily from FIG. 1, if $\psi$ is 0 for wavelengths on one side of the response curve minimum, it is $\pi$ for wavelengths on the other side.

The output from balanced modulator 24 in FIG. 2 is fed through a direct-current chopper 26 and an amplifier 27 to the control phase of a servo motor 28. Chopper 26 and the reference phase of motor 28 are both powered from an alternating-current source 29. Motor 28 is coupled mechanically through a suitable reducing gear to a differential driving gear 30 and the so-called wavelength drum 31 of the spectrometer. Wavelength drum 31 is mechanically coupled to mirror 17 so the latter undergoes similar movement about its axis.

In accordance with another feature of the invention, reference voltage source 25 is also used to provide the variation superimposed upon the motion of drum 31 and mirror 17, thus assuring proper synchronism between the reference voltage and the voltage applied to modulator 24 from filter 23. Voltage from source 25 is supplied to a motor 32 which drives an eccentric cam mechanism 33. Cam mechanism 33 is, in turn, coupled to differential driving gear 30. As illustrated diagramamtically in FIG. 2, cam mechanism 33 superimposes a periodic variation of frequency $f_o$ and amplitude $\Delta\lambda$ upon the angular position of wavelength drum 31 and mirror 17.

In operation, the embodiment of the invention illustrated in FIG. 2 superimposes a relatively small sinusoidal variation of frequency $f_o$ upon the wavelength of the infrared radiation impinging upon sample 18. If the wavelength is below the wavelength of minimum infrared reflectivity, the phase of the response variation provides a positive voltage out of modulator 24, driving servo motor 28 in the direction to increase wavelength. If, on the other hand, the wavelength is above the wavelength of minimum reflectivity, the phase of the response variation is opposite and provides a negative voltage. Motor 28 is then driven in the direction to reduce wavelength. Servo motor 28 comes to rest when substantially no corrective voltage in either direction is received. At that time, the angular position of wavelength drum 31 and mirror 17 is the position of minimum infrared reflectivity. The particular value of λ at that position can be read directly from wavelength drum 31.

The principles of the invention are, of course, as valid for measuring maxima as for measuring minima. In the embodiment illustrated in FIG. 2, for example, only a simple change is needed to make the same apparatus automatically seek the nearest curve maximum. The connections betwen modulator 24 and chopper 26 are simply reversed so that the phase which previously caused motor 28 to increase λ reduces it and the phase which previously caused motor 28 to decrease λ increases it.

Although it is infrared reflectivity that is of primary interest because of the bearing the wavelength of minimum reflectivity has upon resistivity, there may be times when it is desirable to make similar measurements of infrared transmission. The wavelength of maximum transmission is, for example, obviously the same as the wavelength of minimum reflectivity. For transmission measurements in the embodiment of the invention illustrated in FIG. 2, infrared detector 20 is transferred to the opposite side of sample 18 and positioned to receive the light transmitted through sample 18 rather than that reflected from it.

Figure 3:
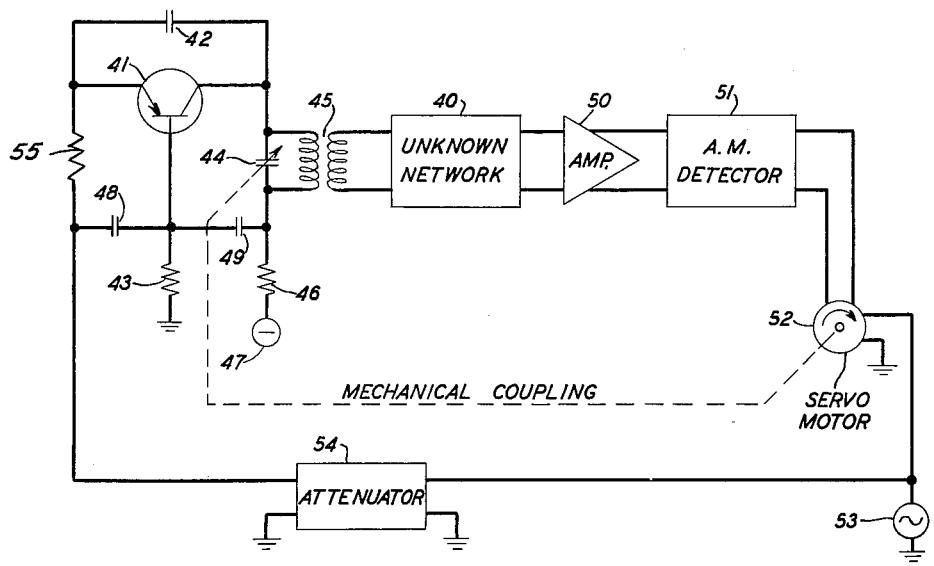
FIG. 3 illustrates further application of the invention to provide automatic determination of maxima or minima in the response versus frequency curve of a four-terminal wave transmission network.

Although the invention has been described thus far chiefly with respect to apparatus for determining maxima and minima in the infrared transmission of reflection characteristics of semiconductive materials, its underlying principles can be applied to determine maxima or minima in the response characteristic of any wave responsive medium. It can, for example, be employed quite readily to locate frequencies at which the wave transmission characteristic of an electrical network reaches a maximum or a minimum. FIG. 3 illustrates an embodiment of the invention adapted for such use.

In the embodiment of the invention illustrated in FIG. 3, a four-terminal wave transmission network 40 is the unknown quantity being tested and is supplied with oscillations from a frequency-controlled oscillator. Although any accurately controllable oscillator will do, the one shown includes a p-n-p transistor 41, a feedback capacitor 42 connected between the emitter and collector electrodes of transistor 41, a biasing resistor 55 having one end connected to the emitter electrode of transistor 41, a biasing resistor 43 connected between the base electrode of transistor 41 and ground, and a tank circuit made up of a variable capacitor 44 and the primary winding of an output transformer 45 connected from the collector electrode of transistor 41 through a dropping resistor 46 to a negative potential source 47. In addition, a pair of radio frequency bypass capacitors 48 and 49 are respectively connected from the base electrode of transistor 41 to the other end of resistor 55 and to the high potential side of dropping resistor 46. The oscillator is substantially the same as those shown in the present inventor's prior Patent 2,771,584, which issued November 20, 1956. The oscillator is made to oscillate in the vicinity of the so-called alpha cut-off frequency of transistor 41; with the result that a significant portion of the total phase shift around the oscillator feedback loop is supplied by the transistor itself. The frequency of oscillation is determined primarily by the setting of variable capacitor 44 in the tank circuit but is varied at an audio rate by a voltage applied to the emitter electrode of transistor 41. The result is a frequency modulation superimposed upon the radio frequency wave generated by the oscillator.

In FIG. 3, oscillations are supplied to the unknown network 40 by transformer 45. These oscillations have, in accordance with the invention, a frequency variation superimposed upon them which is of substantially constant magnitude but small in comparison with the total frequency range of the oscillator. On the output side of network 40 are, in sequence, an amplifier 50, an amplitude-modulation detector 51, and the control phase of an A.-C. servo motor 52. The shaft of motor 52 is coupled mechanically, through appropriate reduction gearing, to the control shaft of variable capacitor 44 in the oscillator tank circuit.

The reference phase of servo motor 52 is supplied with current from an A.-C. source 53 which also is connected through an attenuator 54 to the emitter electrode of transistor 41 in the oscillator circuit. A.-C. source 53 may be, for example, a standard 60-cycle power source and serves not only to provide a reference for servo motor 52 but also to impress a regular variation of substantially constant magnitude upon the frequency of the transistor oscillator.

In the operation of the embodiment of the invention illustrated in FIG. 3, a regular voltage variation of substantially constant magnitude is imposed upon the emitter electrode of transistor 41. As explained above, these emitter voltage variations cause corresponding changes in the phase shift through transistor 41. As a result, the oscillating frequency of transistor 41 continually readjusts itself to maintain zero phase around the feedback loop of the oscillator at the oscillating frequency. This frequency-modulated radio-frequency signal is passed through the unknown four-terminal network 40. Since the transmission through the unknown network 40 varies with frequency, the output from network 40 is essentially an amplitude-modulated wave. This wave is amplified and then demodulated. The signal applied to the control phase of servo motor 52 is, for all practical purposes, a wave whose frequency is that of A.-C. source 53 and whose amplitude is a measure of the response of network 40 to the wave generated by the transistor oscillator. The phase of the signal is dependent, in the manner shown in FIG. 1, upon whether the center frequency of the oscillator is above or below the frequency of a minimum or a maximum. The relative poling of the connections between detector 51 and the control phase of servo motor 52 determine whether a minimum or a maximum is sought by the apparatus.

As long as a demodulated wave of the frequency of A.-C. source 53 persists at the control phase of motor 52, the motor operates in the direction to move the center frequency of the transistor oscillator toward the maximum or minimum response frequency being sought. The mechanical coupling between motor 52 and variable capacitor 44 in the oscillator tank circuit changes the basic oscillation frequency upon which the further variation is superimposed. Motor 52 comes to rest when the frequency of minimum or maximum response is reached for the reason that any further frequency change in the same direction produces a corrective signal which tends to turn motor 52 in the opposite direction.

Although quite dissimilar in detail, the embodiments of the invention illustrated in FIGS. 2 and 3 are similar in that they employ the invention to obtain an automatic and accurate measure of maxima or minima in the response characteristic of a wave responsive medium, whether the medium be a material or a network. Both free the user from any necessity for plotting response curves, differentiating them, or interpreting them by visual inspection.

It is to be understood that the above-described arrangements are illustrative of the application of the principles of the invention. Numerous other arrangements may be devised by those skilled in the art without departing from the spirit and scope of the invention.

What is claimed is:

1. An arrangement for determining maxima or minima in the response curve of a wave responsive material which comprises means to apply a wave of substantially constant amplitude to said material, means to modulate a parameter of said wave cyclically about a central value under the control of an auxiliary periodic variation of substantially constant peak amplitude and substantially constant frequency, the maximum deviation of said parameter of said wave about said central value after modulation being many times smaller than the total range of said parameter in said response curve, means to detect the response of said material to said wave, said response having a periodic variation with the same frequency as said auxiliary modulating variation, and means to shift the central value of said parameter of said wave in the direction required to reverse the phase of the fundamental component of said periodic variation of said response.

2. An arrangement for determining maxima or minima in the amplitude versus wavelength response characteristic of an electromagnetic wave responsive material which comprises means to apply an electromagnetic wave of substantially constant amplitude to said material, means to modulate the wavelength of said wave cyclically about a central value under the control of an auxiliary sinusoidal variation of substantially constant peak amplitude and substantially constant frequency, the maximum deviation of the wavelength of said wave about said central value after modulation being many times smaller than the total wavelength range of said response characteristic, means to detect the response of said material to said wave, said response having a sinusoidal amplitude variation with the same frequency as said auxiliary modulating variation, and means to shift the central value of the wavelength of said wave in the direction required to reverse the phase of the fundamental component of said sinusoidal amplitude variation of said response.

3. An arrangement for determining maxima or minima in the amplitude versus wavelength response characteristic of an electromagnetic wave reflective material which comprises means to apply an electromagnetic wave of substantially constant amplitude to said material, means to modulate the wavelength of said wave cyclically about a central value under the control of an auxiliary sinusoidal variation of substantially constant peak amplitude and substantially constant frequency, the maximum deviation of the wavelength of said wave about said central value after modulation being many times smaller than the total wavelength range of said response characteristic, means to detect the portion of said wave reflected by said material, the reflected portion of said wave having a sinusoidal amplitude variation with the same frequency as said auxiliary modulating variation, and means to shift the central value of the wavelength of said wave in the direction required to reverse the phase of the fundamental component of said sinusoidal amplitude variation of the reflected portion of said wave.

4. An arrangement for determining maxima or minima in the amplitude versus wavelength response characteristic of an electromagnetic wave transmission medium which comprises means to transmit an electromagnetic wave of substantially constant amplitude through said medium, means to modulate the wavelength of said wave cyclically about a central value under the control of an auxiliary sinusoidal variation of substantially constant peak amplitude and substantially constant frequency, the maximum deviation of the wavelength of said wave about said central value after modulation being many times smaller than the total wavelength range of said response characteristic, means to detect the response of said medium to said wave, said response having a sinusoidal amplitude variation with the same frequency as said auxiliary modulating variation, and means to shift the central value of the wavelength of said wave in the direction required to reverse the phase of the fundamental component of said sinusoidal amplitude variation of said response.

5. The method of determining maxima or minima in the response curve of a wave responsive material which comprises applying a wave of substantially constant amplitude to said material, modulating a parameter of said wave cyclically about a central value under the control of an auxiliary periodic variation of substantially constant peak amplitude and substantially constant frequency, the maximum deviation of said parameter of said wave about said central value after modulation being many times smaller than the total range of said parameter of said response curve, detecting the response of said material to said wave, said response having a periodic variation with the same frequency as said auxiliary modulating variation, and shifting the central value of said parameter of said wave in the direction required to reverse the phase of the fundamental component of said periodic variation of said response.

6. The method of determining maxima or minima in the amplitude versus response characteristic of an electromagnetic wave responsive material which comprises applying an electromagnetic wave of substantially constant amplitude to said material, modulating the wavelength of said wave cyclically about a central value under the control of an auxiliary sinusoidal variation of substantially constant peak amplitude and substantially constant frequency, the maximum deviation of the wavelength of said wave about said central value after modulation being many times smaller than the total wavelength range of said response characteristic, detecting the response of said material to said wave, said response having a sinusoidal variation of the same frequency as said auxiliary modulating variation, and shifting the central value of the wavelength of said wave in the direction required to reverse the phase of the fundamental component of said sinusoidal amplitude variation of said response.

References Cited by the Examiner

UNITED STATES PATENTS

| | | | |
|---|---|---|---|
| 1,936,796 | 11/1933 | Legg | 324—57 |
| 2,750,834 | 6/1956 | Golay | 324—83 X |
| 2,790,141 | 4/1957 | Geppert | 324—158 X |
| 2,859,407 | 11/1958 | Heinisch | 324—158 |
| 3,038,369 | 6/1962 | Davis. | |
| 3,039,056 | 6/1962 | Many | 324—62 X |
| 3,043,956 | 7/1962 | Cohen | 250—83.3 |
| 3,044,734 | 7/1962 | Heppe | 324—83 X |

FOREIGN PATENTS

| | | |
|---|---|---|
| 1,013,011 | 8/1957 | Germany. |
| 860,433 | 2/1961 | Great Britain. |

OTHER REFERENCES

"Anomalous Surface Channels on Silicon p-n Junctions," Journal of Applied Physics, October 1960, pages 1791–1792.

"Phase Shift Method of Carrier Lifetime Measurements in Semiconductors," The Review of Scientific Instruments, pages 889–891, October 1958.

"Self Balancing Resistivity Measuring Set," ATC Research and Development Report TID–4500, IDO–16573, Idaho Operations Office, U.S. Atomic Energy Commission, Feb. 15, 1960.

WALTER L. CARLSON, *Primary Examiner.*